(12) United States Patent  
Bianchessi

(10) Patent No.: US 7,710,392 B2  
(45) Date of Patent: May 4, 2010

(54) POINTING DEVICE FOR A COMPUTER SYSTEM WITH AUTOMATIC DETECTION OF THE STATE OF MOTION, AND A RELATIVE CONTROL METHOD

(75) Inventor: Marco Bianchessi, Melzo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1166 days.

(21) Appl. No.: 11/317,633

(22) Filed: Dec. 22, 2005

(65) Prior Publication Data

US 2006/0164390 A1 Jul. 27, 2006

(30) Foreign Application Priority Data

Dec. 29, 2004 (EP) .................................. 04425958

(51) Int. Cl.
*G09G 5/00* (2006.01)

(52) U.S. Cl. ................. 345/156; 345/161; 345/163; 345/164; 345/179; 345/501

(58) Field of Classification Search ............. 345/156, 345/157, 160, 162, 163, 164
See application file for complete search history.

(56) References Cited

U.S. PATENT DOCUMENTS

| 4,787,051 | A | 11/1988 | Olson | 364/518 |
|---|---|---|---|---|
| 5,181,181 | A | 1/1993 | Glynn | 364/566 |
| 5,581,484 | A * | 12/1996 | Prince | 702/150 |
| 5,956,660 | A | 9/1999 | Neumann | 702/150 |
| 6,308,134 | B1 | 10/2001 | Croyle et al. | 701/220 |
| 7,310,154 | B2 * | 12/2007 | Kitaguchi et al. | 356/603 |
| 2001/0000125 | A1* | 4/2001 | Zimmerman et al. | 345/161 |
| 2003/0142065 | A1* | 7/2003 | Pahlavan | 345/156 |
| 2004/0140965 | A1* | 7/2004 | Wang et al. | 345/179 |
| 2006/0170653 | A1* | 8/2006 | Cok | 345/157 |

* cited by examiner

*Primary Examiner*—Bipin Shalwala  
*Assistant Examiner*—Vince E Kovalick  
(74) *Attorney, Agent, or Firm*—Lisa K. Jorgenson; Eric M. Ringer; Seed IP Law Group PLLC

(57) ABSTRACT

A pointing device for a computer system includes a displacement transducer of the pointing device, provided with: an inertial sensor, supplying acceleration signals indicative of an acceleration according to two axes of detection; and a processing unit, which, on the basis of the acceleration signals, generates velocity signals regarding the pointing device. The processing unit further includes: a state-recognition stage, for selectively recognizing a condition rest and a motion condition of the pointing device on the basis of the velocity signals; and an estimating module, controlled by the state-recognition stage for determining an estimate of stationary disturbance contained in the acceleration signals when the pointing device is in the rest condition.

43 Claims, 3 Drawing Sheets

POINTING DEVICE FOR A COMPUTER SYSTEM WITH AUTOMATIC DETECTION OF THE STATE OF MOTION, AND A RELATIVE CONTROL METHOD

TECHNICAL FIELD

The present disclosure generally relates to a pointing device for a computer system with automatic detection of the state of motion and to a relative control method.

BACKGROUND INFORMATION

As is known, by now all computer systems and other electronic apparatuses equipped with graphic interface are provided with pointing devices, which enable the user to interact in an extremely simple and intuitive way. The most widespread pointing device, namely, the mouse, is provided with a shell, wherein a motion transducer is housed. The shell is gripped and translated by the user, generally along a horizontal sliding surface, and the motion transducer sends signals indicating the path followed by the mouse to the computer system. The signals are then processed by the computer system for updating the position of a cursor displayed by the graphic interface. Normally, the mouse is also equipped with a number of pushbuttons, which the user can use for issuing further commands to the computer system.

As regards the motion transducer, several solutions have been proposed. The most-common envisages the use of a small and rather heavy ball, trapped within the shell and projecting from the bottom part thereof so as to rest on the sliding surface. The ball is coupled to two mutually perpendicular spindles or rollers, mounted on which are respective sensors of rotation (encoders). During the mouse motion, the ball rotates and transmits the rotation to the rollers by friction. The rotation is detected by the encoders and then used for calculating the translation of the mouse.

However, this solution is not reliable and is rather complex. In fact, if the ball is not perfectly mechanically coupled to the sliding surface and to the rollers, relative sliding, that prevents precise detection of the of the mouse motion, may occur. In an attempt to prevent relative sliding, the ball is usually made of a material having a high friction coefficient and is forced against the rollers via further presser rollers loaded by springs. Nevertheless, the dirt that is inevitably gathered by the ball during use rapidly degrades the quality of the mechanical coupling, and thus the mouse becomes in a short time far from precise, if not altogether unusable. A further problem is due to the electrical contacts of the encoders, which are subject to wear and tend to oxidize. Hence, in practice, a mouse based upon the conventional ball system can preserve good characteristics of precision only for a short time.

More recently, mice with optical detection of the motion have been proposed. In this case, the motion transducer includes a light source, which illuminates a portion of the sliding surface of the mouse, and an optical sensor coupled thereto. The optical sensor is adapted to reconstruct the relative displacement of the mouse with respect to the sliding surface starting from the brightness variations of the illuminated portion. This solution does not present the drawbacks of mechanical mice, and, moreover, the most recent developments have enabled the use of optical mice on any type of surface. However, also optical mice have limitations, principally on account of the high power dissipation. In fact, the light source that illuminates the sliding surface must be always active, even during periods in which the mouse is not being used. It should be noted that, even in situations in which the mouse is exploited very intensively, the periods of inoperativeness are by far more prevalent. In other words, then, the power consumption of optical mice is constantly high and, most of the time, the power used is not exploited for useful functions. This drawback is particularly severe in battery-supplied mice, such as wireless mice, which are spreading in an increasingly rapid way, because it markedly limits the autonomy of the device. A further disadvantage of movement transducers of an optical type is the high manufacturing cost.

Also known are mice that use inertial sensors with two independent detection axes as motion transducers, which are also referred to as inertial mice. The inertial sensors are fixed to the shell of the mouse and issue acceleration signals according to the two detection axes when the mouse is moved by the user. The acceleration signals are integrated in time a first time and a second time, for calculating the mouse velocity and position, respectively, in an absolute frame of reference fixed with respect to the sliding surface. For various reasons, however, also inertial mice are very far from precise. In the first place, the acceleration signals generated by the inertial sensors are inevitably affected by unknown offsets, which are due to the control and reading circuits of the inertial sensors. Since the acceleration signals must be integrated and, obviously, the mean value of the offset is non-zero, the error caused by the offsets results in a fictitious velocity which increases linearly in time. Furthermore, the integration envisages estimation of at least one value of velocity (for each detection axis) with respect to the absolute frame of reference. As occurs for the offsets, also the absolute velocity estimation errors are amplified by the integration, and consequently the estimation of the instantaneous velocity of the mouse is affected by an imprecision that increases in time. A further factor of imprecision derives from the fact that inertial sensors detect also the force of gravity. If the detection axes are not perfectly horizontal, the acceleration signals include, in addition to the components due to the motion of the mouse, also a component correlated to the force of gravity, which, in practice, has the same effect as the offsets and as the errors of estimation of the initial value of velocity.

BRIEF SUMMARY OF THE INVENTION

Embodiments of the present invention provide a pointing device for computer systems and a method for controlling said device that overcome the above described drawbacks.

According to embodiments of the present invention, a pointing device for a computer system with automatic detection of the state of motion and a method for controlling said device are provided.

BRIEF DESCRIPTION OF THE SEVERAL VIEWS OF THE DRAWING(S)

For a better understanding of the invention, some embodiments thereof are now described purely by way of non-limiting example and with reference to the attached drawings, wherein.

DETAILED DESCRIPTION

Embodiments of a pointing device for a computer system with automatic detection of the state of motion and a related control method are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
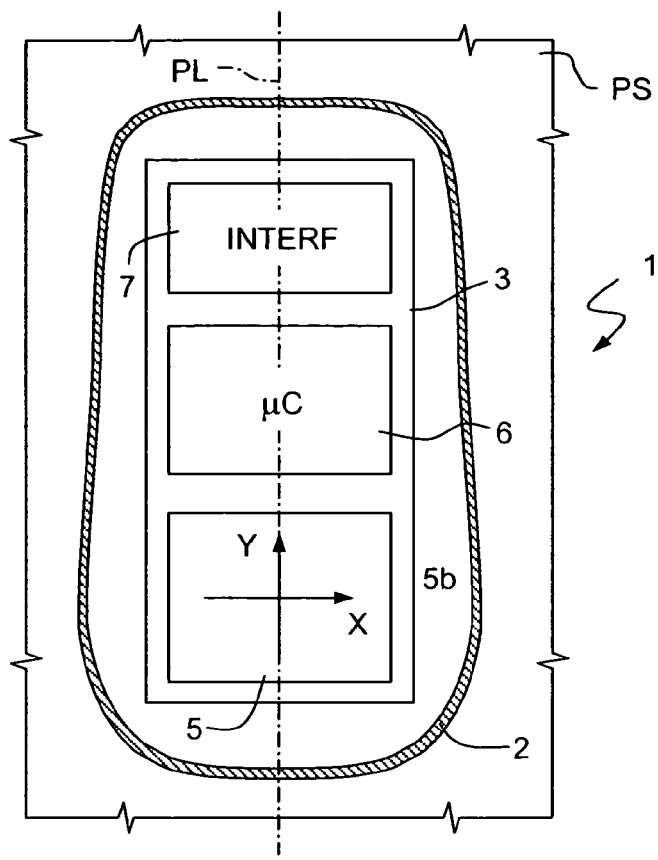
FIG. 1 is a schematic, partially sectioned top plan view of an embodiment of a pointing device for a computer system.
Figure 2:
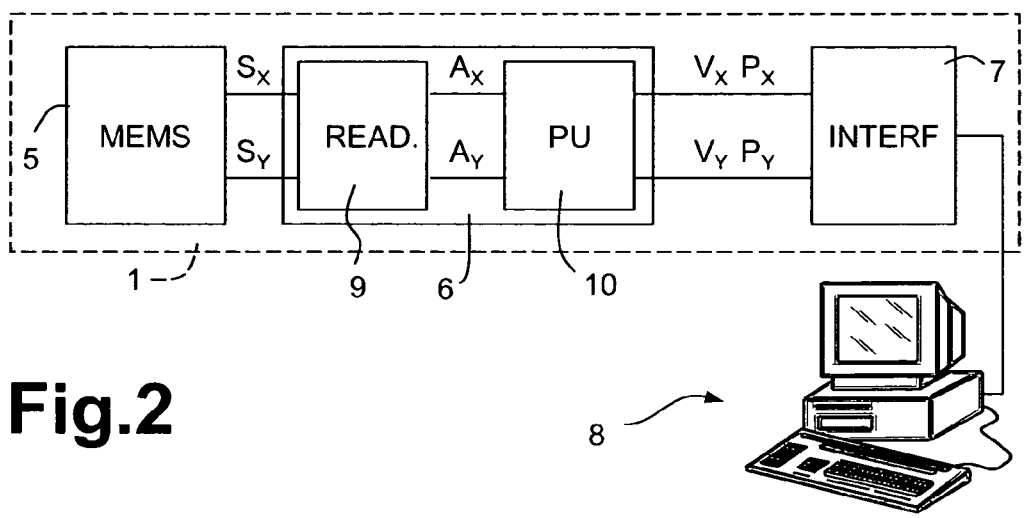
FIG. 2 is a simplified block diagram of the device of FIG. 1.

With reference to FIGS. 1 and 2, an embodiment of a pointing device for a computer system, in particular a mouse 1, comprises a shell 2, a board 3 housed within the shell 2, and an inertial sensor 5 and a microcontroller 6, which are, in turn, located on the board 3 and form a displacement transducer of the mouse 1. Furthermore, the mouse 1 is equipped with an interface 7 for connection with a computer system 8, for communicating information and commands under the control of a user. In particular, the interface 7 is of any standard type suitable for supporting communication with the computer system 8, for example, of a serial RS 232 or USB type. Alternatively, the interface 8 enables a wireless connection through an optical (IR) or radio frequency coupling, for example using the Bluetooth technology.

The inertial sensor 5 of one embodiment is a two axes micro-electro-mechanical accelerometer made with MEMS (micro-electro-mechanical systems) technology. In the embodiment described herein, the inertial sensor 5 is of the type described in the European patent application No. EP-A-1365211 and, optionally, comprises also a single axis accelerometer, as the one described in the European patent application No. EP-A-1253399 filed on Apr. 27, 2001 or in U.S. Pat. No. 5,955,668, for detecting accelerations along three independent directions. Alternatively, the inertial sensor 5 may comprise two single-axis accelerometers, oriented in mutually perpendicular directions.

The inertial sensor 5 is connected to the board 3 so as to be fixed with respect to the shell 2 and has at least a first detection axis X and a second detection axis Y, perpendicular to one another and parallel to a sliding surface PS of the mouse 1 (usually, a substantially horizontal surface). The first detection axis X and the second detection axis Y are moreover perpendicular and parallel, respectively, to a longitudinal (vertical) symmetry plane PL of the shell 2. The inertial sensor 5 is connected to the microcontroller 6 for supplying one first analog acceleration signal $S_X$ and one second analog acceleration signal $S_Y$ (FIG. 2), indicating the accelerations to which the shell 2 and the inertial sensor 5 are subjected respectively along the first detection axis X and the second detection axis Y. As will be discussed in detail hereinafter, the analog acceleration signals $S_X$, $S_Y$ may contain spurious contributions, for example due to the force of gravity, and must be processed by the microcontroller 6 to eliminate the components not correlated with the motion of the mouse 1.

The microcontroller 6 is connected to the computer system 8 through the interface 7 and, when the mouse 1 is active (i.e., moved by the user) it supplies a first velocity signal $V_X$ and a second velocity signal $V_Y$ and a first position signal $P_X$ and a one second position signal $P_Y$, all of which are of a numeric type and are calculated starting from the first analog acceleration signal $S_X$ and from the second analog acceleration signal $S_Y$. For reasons of simplicity, hereinafter reference will be made to a velocity vector V, which has the first velocity signal $V_X$ and the second velocity signal $V_Y$ as components along the first detection axis X and the second detection axis Y, respectively, and to a position vector P, which has the first position signal $P_X$ and the second position signal $P_Y$ as components along the first detection axis X and the second detection axis Y, respectively.

In greater detail, one embodiment of the microcontroller 6 comprises a reading unit 9 and a processing unit 10. The reading unit 9 is connected to the inertial sensor 5 for receiving the first analog acceleration signal $S_X$ and the second analog acceleration signal $S_Y$. In addition, in a per se known manner, the reading unit 9 supplies to the inertial sensor 5 control signals $V_{FB}$ and clock signals $V_{CK}$ necessary for reading, and supplies the processing unit 10 with a first acceleration signal $A_X$ and with a second acceleration signal $A_Y$, of a numeric type, obtained from the analog-to-digital conversion of the first analog acceleration signal $S_X$ and of the second analog acceleration signal $S_Y$, respectively. Also in this case, reference will be made, for reasons of convenience, to a first acceleration vector A, which has the first acceleration signal $A_X$ and the second acceleration signal $A_Y$ as components along the first detection axis X and the second detection axis Y, respectively.

Figure 3:
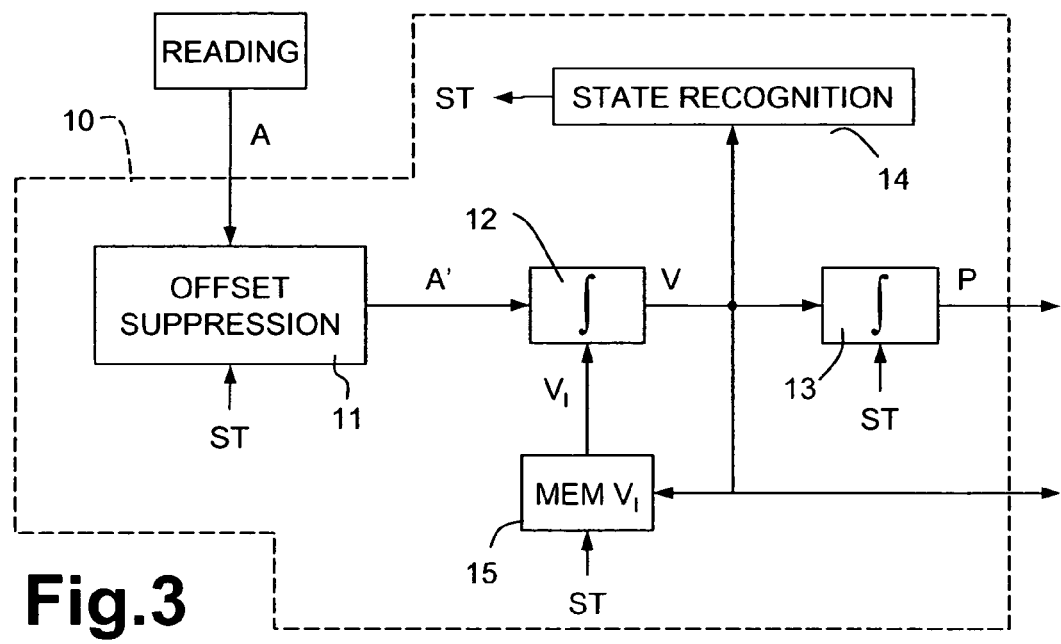
FIGS. 3-5 are more detailed block diagrams of parts of the device of FIGS. 1 and 2, according to a first embodiment of the present invention.

As illustrated in the block diagram of FIG. 3, one embodiment of the processing unit 10 comprises an offset-suppression stage 11, a first integrator module 12, a second integrator module 13, a state-recognition stage 14 and an initial-conditions memory 15.

The offset-suppression stage 11 is connected to the reading unit 9 for receiving the first acceleration vector A and has an output connected to the first integrator module 12. In particular, the offset-suppression stage 11 generates one second acceleration vector A', which, as explained hereinafter, is calculated by estimating and subsequently subtracting from the first acceleration vector A any stationary disturbance (offsets) due either to the circuitry of the inertial sensor 5 or to the action of the force of gravity (more precisely, the first acceleration signal $A_X$ and the second acceleration signal $A_Y$ are separately cleaned from the respective offsets).

The first and second integrator modules 12, 13 are cascade-connected, downstream of the offset-suppression module 11. The first integrator module 12 calculates the velocity vector V starting from the second acceleration vector A' and from an initial velocity value $V_I$, stored in the initial-conditions memory 15. The second integrator module 13 calculates the position vector P starting from the velocity vector V supplied by the first integrator module 12. The velocity vector V and the position vector P are issued at output from the processing unit 10 and supplied to the interface 7. Furthermore, the velocity vector V is supplied also to the initial-conditions memory 15 and, in pre-determined operating conditions indicated hereinafter, is stored therein.

The state-recognition stage 14 is connected to the first integrator module 12 for receiving the velocity vector V and, using the velocity vector V itself, generates a state signal ST, indicating the condition of motion of the mouse 1. In particular, the state signal ST has a first value ST1, when the mouse 1 is in a rest condition, and a second value ST2, when the mouse 1 is in motion. The state signal ST is supplied to the offset-suppression stage 11, to the second integrator module 13, and to the initial-conditions memory 15. In particular, the offset-suppression stage 11 selects one between various modes of offset estimation and elimination on the basis of the value of the state signal ST. Furthermore, when the state signal ST has the first value ST1 (mouse 1 at rest), the second integrator module 13 is disabled, and the initial-conditions memory 15 stores the velocity vector V supplied by the first integrator module 12. When, instead, the state signal ST has the second value ST2 (mouse 1 in motion), the second integrator module 13 is enabled, and the initial-conditions memory 15 ceases storage of the velocity vector V. In practice, the value stored in the initial-conditions memory 15 is the initial velocity value $V_I$, with which the first integrator module 12 is initialized when the mouse 1 exits from the rest state.

The offset-suppression stage 11 exploits the frequent rest periods of the mouse 1, in which the accelerations are zero, for estimating the offsets present in the first acceleration vector A (more precisely, in the first and second acceleration signals $A_X$, $A_Y$). The estimates obtained are subtracted from the new values of the first acceleration vector A both in the phases of rest and in the phases of motion, for determining the second acceleration vector A'. The state signal ST is used by the offset-suppression stage 11 for recognition of the condition of motion of the mouse 1 and for selecting the operations that must be performed.

Figure 4:
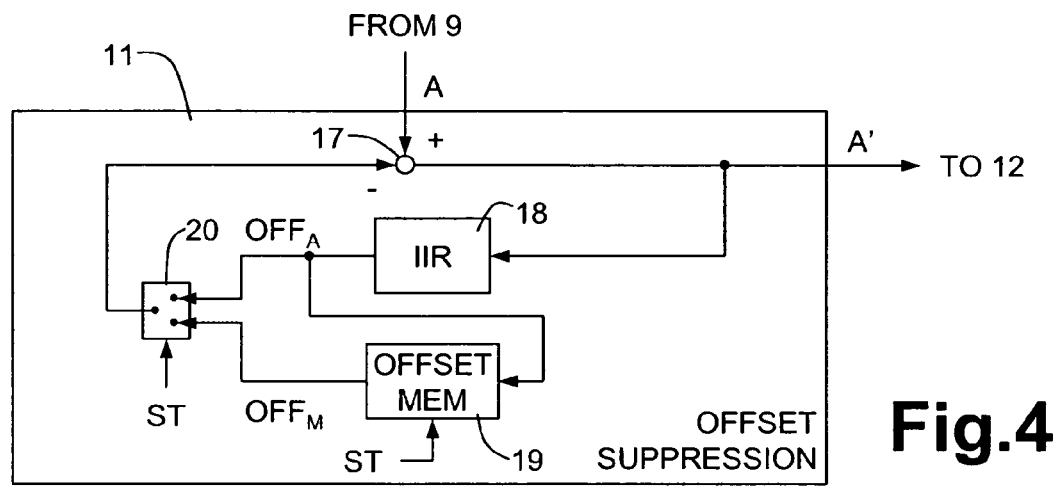

As is shown in FIG. 4, one embodiment of the offset-suppression stage comprises a subtractor node 17, an estimating module 18, an offset memory 19 and a selector module 20. The subtractor node 17 has one first (positive) input connected to the reading unit 9, for receiving the first acceleration vector A, a second (negative) input connected to an output of the selector module 20, and an output, which supplies the second acceleration vector A'. The estimating module 18 may be a numeric filter of a first-order infinite-impulse-response (IIR) type with a low-pass transfer function and is connected to the output of the subtractor node 17, for receiving the second acceleration vector A'. Furthermore, the estimating module 18 calculates a current estimated offset value $OFF_A$, which indicates the offsets present in the second acceleration vector A' when the mouse 1 is in the rest condition. The current estimated offset value $OFF_A$ is supplied to a first input of the selector module 20 and to the offset memory 19. The second storage element 20, which is enabled to store the current offset value $OFF_A$ only when the state signal ST has the first value ST1 (i.e., the mouse 1 is in the rest condition), supplies a stored offset value $OFF_M$ to a second input of the selector module 20. The selector module 20 has an output connected to the second (negative) input of the subtractor node 17 and is in turn controlled by the state signal ST. In particular, when the state signal ST has the first value ST1 (mouse 1 at rest), the selector module 20 supplies, to the subtractor node 17, the current estimated offset value $OFF_A$ supplied by the estimating module 18. When, instead, the state signal ST has the second value ST2 (mouse 1 in motion), the selector module 20 sends the stored offset value $OFF_M$ stored in the offset memory 19 to the subtractor node 17.

In practice, the offset-suppression stage 11 exploits the fact that the electrical offsets associated to the inertial sensor 5 are substantially constant, as well as the contribution due to the force of gravity. Such a contribution, in fact, depends upon the inclination of the inertial sensor 5 of the mouse 1 with respect to the direction of the force of gravity. In almost all cases, the surface sliding PS on which the mouse 1 rests and is moved is a plane and consequently, even though this is not perfectly horizontal, its inclination with respect to the direction of the force of gravity does not vary from point to point anyway. Consequently, also the inclination of the inertial sensor 5 is constant. Other disturbances, such as electrical noise or vibrations transmitted from outside, have a substantially zero average and consequently produce a negligible effect in the steps of integration necessary for calculating the velocity vector V and the position vector P.

When the mouse 1 is at rest, the accelerations are zero, and hence the first acceleration vector A and the second acceleration vector A' are due exclusively to the presence of offsets, which can thus be estimated. For this purpose, the estimating module 18 filters the second acceleration vector A' so as to extract the low-frequency components (i.e., the current estimated offset value $OFF_A$). Instead, during the phases of movement of the mouse 1, the offsets cannot be estimated, and the most recent stored offset value $OFF_M$ is used. Advantageously, of the offset estimate is very frequently updated, because the phases of rest of the mouse are almost always prevalent, even in case of intensive use.

Figure 5:
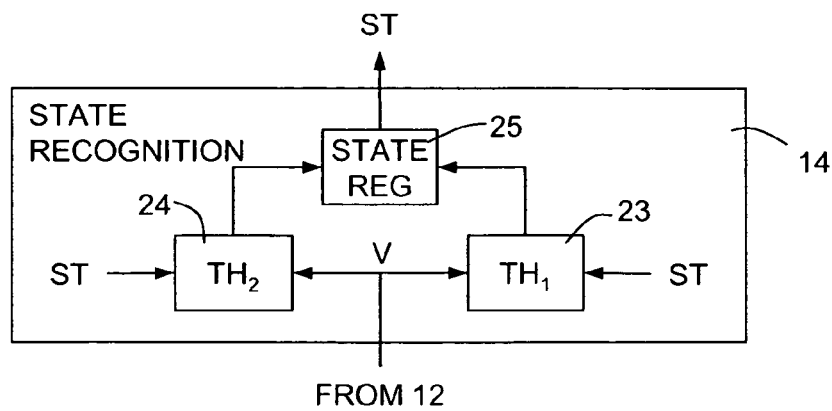

With reference to FIG. 5, the state-recognition stage 14 of one embodiment comprises a first comparator module 23, a second comparator module 24, and a state register 25, where a value of the state signal ST is stored. The first and second comparator modules 23, 24 are both connected to the first integrator module 12, for receiving the velocity vector V, and may be alternately activated by the state signal ST.

In particular, the first comparator module 23 is activated in rest conditions of the mouse 1, i.e., when the state signal ST has the first value ST1. When the first comparator module 23 is active, it compares the modulus of the velocity vector V with a pre-determined first threshold $V_{T1}$. If the first threshold $V_{T1}$ is exceeded, the first comparator module 23 modifies the value of the state signal ST contained in the state register 25. In this way, the state-recognition stage 14 recognizes the passage of the mouse 1 from the rest condition to the motion condition.

The second comparator module 24 is active when the state signal ST has the second value ST2 (mouse 1 in motion) and operates in a substantially dual way. In this case, the modulus of the velocity vector V is compared with a second threshold $V_{T2}$ higher than the first threshold $V_{T1}$. Furthermore, the second threshold $V_{T2}$ may be fixed or, alternatively, increase in time starting from a pre-determined value, at which it is initialized whenever the state signal ST switches from the first value ST1 to the second value ST2. If the modulus of the velocity vector V drops below the second threshold $V_{T2}$, the second comparator module 24 modifies the value-of the state signal -ST contained in the state register 25. In this way, the state-recognition stage 14 recognizes the passage of the mouse 1 from the motion condition to the rest condition. Advantageously, the use of two different thresholds for detecting passage from the rest condition to the motion condition and vice versa enables preventing effects that are undesirable and troublesome for the user. In particular, for the first threshold $V_{T1}$ a rather low value can be chosen so as to promptly follow the motion of the mouse 1 right from the start, without any delay. Instead, a second higher threshold $V_{T2}$ enables recognition of arrest of the mouse 1 even in the presence of possible low-frequency disturbance, which for example has intervened after the step of offset estimation. Since the low-frequency disturbance can be amplified by integration and can increase, the modulus of the velocity vector V could remain higher than the threshold even with the mouse 1 stationary, if just one threshold were to be used in all cases. In practice, arrest of the mouse would not be recognized, and the cursor displayed on the screen of the computer system would continue to move indefinitely.

Figure 6:
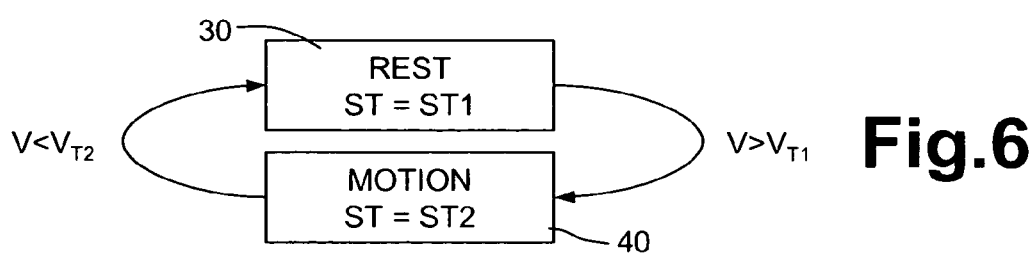
FIG. 6 is a state diagram regarding the device of FIGS. 1-5.
Figure 7:
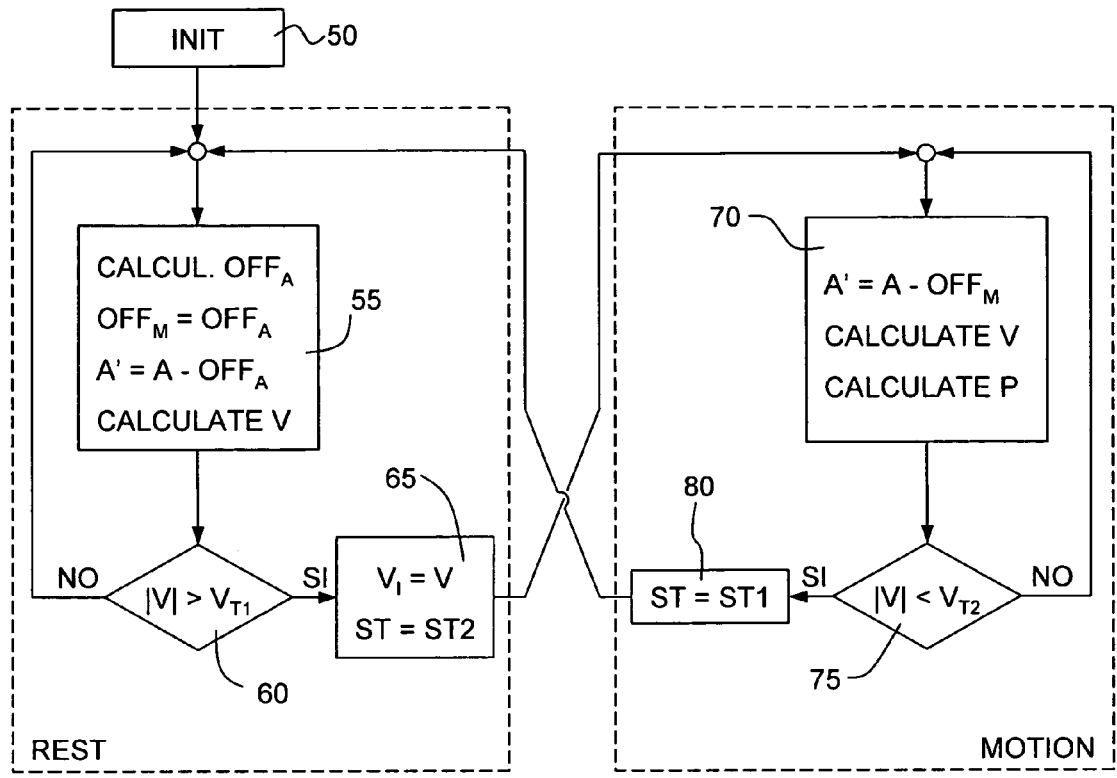
FIG. 7 is a flowchart regarding the device of FIGS. 1-5.

The mouse 1 implements in practice a finite-state machine with two states, as illustrated in FIGS. 6 and 7. A first state 30, which the first value ST1 of the state signal ST is associated to, corresponds to the rest condition of the mouse 1. A second state 40, which the second value ST2 of the state signal ST is associated to, corresponds to the motion condition of the mouse 1. The condition for the passage from the first state 30 to the second state 40 is:

$$|V| > V_{T1}$$

whilst the condition for passage from the second state 40 to the first state 30 is:

$$|V| < V_{T2}$$

With reference to FIG. 7, after an initialization step (block 50), operations regarding the first state 30 are executed. More precisely, the current estimated offset value $OFF_A$ is calculated and stored in the offset memory 19 (as described above with reference to FIG. 4) and, using the current estimated offset value $OFF_A$, the second acceleration vector A' and the velocity vector V (block 55) are calculated. Then, the modulus of the velocity vector V is compared with the first threshold $V_{T1}$ (block 60). If the modulus of the velocity vector V is smaller (output NO from block 60), the block 55 is executed again. Otherwise (output YES from block 60), the last value of the velocity vector V is stored in the initial-conditions memory 15 (FIG. 3), and the second value ST2 is assigned to the state signal ST (block 65). In this way, the finite-state machine switches onto the second state 40. In particular, the second acceleration vector A' is first calculated, using the stored offset value $OFF_M$, then the velocity vector V and the position vector P are calculated (block 70). Then, the modulus of the velocity vector V is compared with the second threshold $V_{T2}$ (block 75). If the second threshold $V_{T2}$ is exceeded (output NO from block 75), the machine remains in the second state 40 and block 70 is executed again. Otherwise (output YES from block 75), the first value ST1 is assigned to the state signal ST (block 80), and block 55 is executed, with a consequent return to the first state 30.

Figure 8:
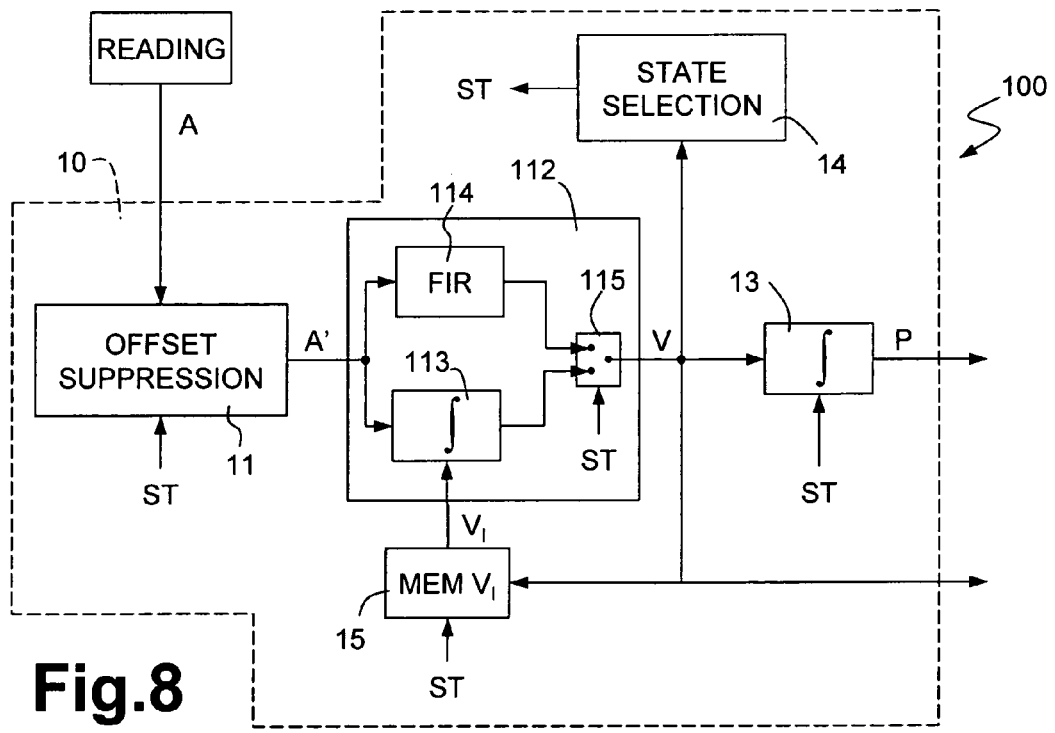
FIG. 8 is a block diagram of a pointing device made according to a second embodiment of the present invention.

A different embodiment of the invention is illustrated in FIG. 8, where parts that are the same as those already shown are designated by the same reference numbers and letters, for reasons of simplicity. In this case, a mouse 100 is provided with an inertial sensor (not illustrated), built and assembled as the inertial sensor 5 of FIGS. 1 and 2, with a microcontroller 106, comprising the reading unit 9 and a processing unit 110, and with a communication interface with a computer system (not shown).

The processing unit 110 comprises the offset-suppression stage 11, an integration stage 112, the second integrator module 13, the state-recognition stage 14, and the initial-conditions memory 15. The integration stage 112 is connected downstream of the offset-suppression stage 11 for receiving the second acceleration vector A', and supplies the velocity vector V to the second integrator module 13, to the state-recognition stage 14, and to the initial-conditions memory 15. Furthermore, the integration stage 112 comprises a third integrator module 113, a moving-average (FIR) filter 114, and a selector module 115. The third integrator module 113 and the filter 114 receive the second acceleration vector A' from the offset-suppression stage 11 and their outputs are connected to respective inputs of the selector module 115. Furthermore, the third integrator module 113 and the filter 114 may be alternately activated by the state signal ST. In particular, when the state signal ST has the first value ST1, the filter 114 is active, and, when the state signal ST has the second value ST2, the third integrator module 113 is active. Also the selector module 115 is controlled by the state signal ST and connects the output of the filter 114 and of the third integrator module 113 to the second integrator module, when the state signal ST has the second value ST2 and the first value ST1, respectively. Since the filter 114 is of the moving-average type, only a pre-determined number of samples of the second acceleration vector A' is actually used for the calculation of the velocity vector V when the mouse 100 is at rest. Advantageously, then, possible drawbacks residing in that the integrators tend to have an infinite d.c. gain are prevented. Furthermore, by choosing appropriately the order of the filter 114 it is in any case possible to maintain a sufficient precision in the calculation of the velocity vector V. In other words, it is possible to follow start of the movement of the mouse 100 without any delay and to estimate the initial value of velocity $V_1$ in a precise way.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A pointing device for a computer system including a displacement transducer of the pointing device, wherein said displacement transducer comprises:
   an inertial sensor to supply first acceleration signals indicative of an acceleration of the pointing device according to two detection axes; and
   processing means, associated to said inertial sensor for generating velocity signals indicative of a velocity of the pointing device, on a basis of said first acceleration signals;
   wherein said processing means includes state-recognition means for selectively recognizing a rest condition and a motion condition of the pointing device, on a basis of said velocity signals; and
   estimating means, controlled by said state-recognition means for determining an estimate of stationary disturbance contained in said first acceleration signals when the pointing device is in the rest condition;
   wherein said processing means comprise subtraction means for subtracting said estimate from said first acceleration signals and for generating second acceleration signals, wherein said processing means comprise first integrating means for generating said velocity signals from said second acceleration signals.

2. The device according to claim 1 wherein said processing means comprise a first storage element, associated to said estimating means for receiving said estimate when the pointing device is in the rest condition.

3. The device according to claim 2 wherein said estimating means are controlled by said state-recognition means for supplying a current value of said estimate to said subtraction means when the pointing device is in the rest condition, and said first storage element is controlled by said state-recognition means for supplying a stored value of said estimate to said subtraction means when the pointing device is in the motion condition.

4. The device according to claim 1 wherein said state-recognition means comprise a first comparator and a second comparator, coupled to said first integrating means for comparing said velocity signals with a first threshold and, respectively, a second threshold.

5. The device according to claim 4, further comprising a second storage element controlled by said first and second comparators and wherein a state signal, having a first value when the pointing device is in the rest condition and a second value when the pointing device is in the motion condition, is stored in said second storage element.

6. The device according to claim 4 wherein said second threshold is increasing in time.

7. The device according to claim 1 wherein said first integrating means comprise a moving-average filter for generating said velocity signals on a basis of said second acceleration signals, selectively when the pointing device is in the rest condition.

8. The device according to claim 1 wherein said processing means further comprise second integrating means, cascaded to said first integrating means for generating position signals, indicative of a position of the pointing device, on a basis of said velocity signals.

9. The device according to claim 1 wherein said estimating means comprise an infinite-impulse-response filter of a first order.

10. The device according to claim 1, further comprising an interface for connection with a computer system.

11. The device according to claim 1 wherein said inertial sensor means comprise a micro-electro-mechanical accelerometer.

12. A computer system, comprising:
a pointing device;
an inertial sensor included with the pointing device to supply first acceleration signals indicative of an acceleration of the pointing device according to two detection axes;
a processing unit, coupled to the inertial sensor, to generate velocity signals indicative of a velocity of the pointing device, on a basis of the first acceleration signals;
a state-recognition unit to selectively recognize a rest condition and a motion condition of the pointing device, on a basis of the velocity signals generated by the processing unit;
an estimation module, coupled to and controlled by said state-recognition unit, to determine an estimate of stationary disturbance contained in the first acceleration signals if the pointing device is in the rest condition;
a subtraction module, coupled to the inertial sensor and to the estimation module, to subtract the estimate from the first acceleration signals and to generate second acceleration signals;
an integration module coupled to the subtraction module to generate the velocity signals from the second acceleration signals; and an interface coupled included with the pointing device to allow the pointing device to communicate with some other component of the computer system.

13. The computer system of claim 12 wherein said estimating means comprise an infinite-impulse-response filter of a first order.

14. The computer system of claim 12 wherein said inertial sensor means comprise a micro-electro-mechanical accelerometer.

15. A method for controlling a pointing device of a computer system, the method comprising:
detecting first acceleration signals indicative of an acceleration of the pointing device according to two detection axes;
generating velocity signals indicative of a velocity of said pointing device, on a basis of said first acceleration signals;
selectively recognizing a rest condition and a motion condition of the pointing device, on a basis of said velocity signals;
determining an estimate of stationary disturbance contained in said first acceleration signals when the pointing device is in the rest condition;
storing said estimate when the pointing device is in the rest condition; and
subtracting said estimate from said first acceleration signals for generating second acceleration signals, wherein said subtracting comprises subtracting a current value of said estimate when the pointing device is in the rest condition and subtracting a stored value of said estimate when the pointing device is in the motion condition.

16. The method according to claim 15 wherein said recognizing comprises:
selecting a first operating configuration, associated to the rest condition of the pointing device;
starting from said first operating configuration, comparing said velocity signals with a first threshold;
selecting a second operating configuration, associated to the motion condition of the pointing device if said first threshold is exceeded;
starting from said second operating configuration, comparing said velocity signals with a second threshold; and
selecting said first operating configuration, if said second threshold is not exceeded.

17. The method according to claim 16 wherein said second threshold is increasing in time.

18. An article of manufacture, comprising:
a computer-readable medium having instructions stored thereon that are executable by a processor to control a pointing device of a computer system, by:
detecting first acceleration signals indicative of an acceleration of the pointing device according to two detection axes;
generating velocity signals indicative of a velocity of said pointing device, on a basis of the first acceleration signals;
selectively recognizing a rest condition and a motion condition of the pointing device, on a basis of the velocity signals; and
determining an estimate of stationary disturbance contained in the first acceleration signals if the pointing device is in the rest condition; and
subtracting the estimate from the first acceleration signals to generate second acceleration signals, wherein instructions for subtracting include instructions for subtracting a current value of the estimate if the pointing device is in the rest condition and subtracting a stored value of the estimate if the pointing device is in the motion condition.

19. The article of manufacture of claim 18 wherein the instructions for selectively recognizing the rest condition and the motion condition include instructions for:
- selecting a first operating configuration, associated with the rest condition of the pointing device;
- starting from the first operating configuration, comparing the velocity signals with a first threshold;
- selecting a second operating configuration, associated with the motion condition of the pointing device if the first threshold is exceeded;
- starting from the second operating configuration, comparing the velocity signals with a second threshold; and
- selecting the first operating configuration, if the second threshold is not exceeded.

20. A pointing device for a computer system including a displacement transducer of the pointing device, wherein said displacement transducer comprises:
- an inertial sensor to supply first acceleration signals indicative of an acceleration of the pointing device according to two detection axes;
- processing means, associated to said inertial sensor for generating velocity signals indicative of a velocity of the pointing device, on a basis of said first acceleration signals;
- wherein said processing means includes state-recognition means for selectively recognizing a rest condition and a motion condition of the pointing device, on a basis of said velocity signals; and
- estimating means, controlled by said state-recognition means for determining an estimate of stationary disturbance contained in said first acceleration signals when the pointing device is in the rest condition;
- wherein said processing means comprise subtraction means for subtracting said estimate from said first acceleration signals and for generating second acceleration signals;
- wherein said processing means comprise a first storage element, associated to said estimating means for receiving said estimate when the pointing device is in the rest condition;
- wherein said estimating means are controlled by said state-recognition means for supplying a current value of said estimate to said subtraction means when the pointing device is in the rest condition, and said first storage element is controlled by said state-recognition means for supplying a stored value of said estimate to said subtraction means when the pointing device is in the motion condition.

21. The device according to claim 20 wherein said processing means comprise first integrating means for generating said velocity signals from said second acceleration signals.

22. The device according to claim 21 wherein said state-recognition means comprise a first comparator and a second comparator, coupled to said first integrating means for comparing said velocity signals with a first threshold and, respectively, a second threshold.

23. The device according to claim 22, further comprising a second storage element controlled by said first and second comparators and wherein a state signal, having a first value when the pointing device is in the rest condition and a second value when the pointing device is in the motion condition, is stored in said second storage element.

24. The device according to claim 22 wherein said second threshold is increasing in time.

25. The device according to claim 21 wherein said first integrating means comprise a moving-average filter for generating said velocity signals on a basis of said second acceleration signals, selectively when the pointing device is in the rest condition.

26. The device according to claim 21 wherein said processing means further comprise second integrating means, cascaded to said first integrating means for generating position signals, indicative of a position of the pointing device, on a basis of said velocity signals.

27. A pointing device for a computer system including a displacement transducer of the pointing device, wherein said displacement transducer comprises:
- an inertial sensor to supply first acceleration signals indicative of an acceleration of the pointing device according to two detection axes, wherein said inertial sensor means comprise a micro-electro-mechanical accelerometer; and
- processing means, associated to said inertial sensor for generating velocity signals indicative of a velocity of the pointing device, on a basis of said first acceleration signals;
- wherein said processing means includes state-recognition means for selectively recognizing a rest condition and a motion condition of the pointing device, on a basis of said velocity signals; and
- estimating means, controlled by said state-recognition means for determining an estimate of stationary disturbance contained in said first acceleration signals when the pointing device is in the rest condition.

28. The device according to claim 27 wherein said processing means comprise a first storage element, associated to said estimating means for receiving said estimate when the pointing device is in the rest condition.

29. The device according to claim 27 wherein said processing means comprise subtraction means for subtracting said estimate from said first acceleration signals and for generating second acceleration signals, and wherein said processing means comprise first integrating means for generating said velocity signals from said second acceleration signals.

30. The device according to claim 29 wherein said state-recognition means comprise a first comparator and a second comparator, coupled to said first integrating means for comparing said velocity signals with a first threshold and, respectively, a second threshold.

31. The device according to claim 29 wherein said first integrating means comprise a moving-average filter for generating said velocity signals on a basis of said second acceleration signals, selectively when the pointing device is in the rest condition.

32. A method for controlling a pointing device of a computer system, the method comprising:
- detecting first acceleration signals indicative of an acceleration of the pointing device according to two detection axes;
- generating velocity signals indicative of a velocity of said pointing device, on a basis of said first acceleration signals;
- selectively recognizing a rest condition and a motion condition of the pointing device, on a basis of said velocity signals, wherein selectively recognizing a rest condition and a motion condition of the pointing device comprises,
  - selecting a first operating configuration, associated to the rest condition of the pointing device,
  - starting from said first operating configuration, comparing said velocity signals with a first threshold,
  - selecting a second operating configuration, associated to the motion condition of the pointing device if said first threshold is exceeded,
  - starting from said second operating configuration, comparing said velocity signals with a second threshold, and selecting said first operating configuration, if said second threshold is not exceeded;

determining an estimate of stationary disturbance contained in said first acceleration signals when the pointing device is in the rest condition; and subtracting said estimate from said first acceleration signals for generating second acceleration signals, wherein said subtracting comprises subtracting a current value of said estimate when the pointing device is in the rest condition and subtracting a stored value of said estimate when the pointing device is in the motion condition.

33. The method according to claim 32 wherein said second threshold is increasing in time.

34. An article of manufacture, comprising:
a computer-readable medium having instructions stored thereon that are executable by a processor to control a pointing device of a computer system, by:
detecting first acceleration signals indicative of an acceleration of the pointing device according to two detection axes;
generating velocity signals indicative of a velocity of said pointing device, on a basis of the first acceleration signals;
selectively recognizing a rest condition and a motion condition of the pointing device, on a basis of the velocity signals, wherein the instructions for selectively recognizing the rest condition and the motion condition include instructions for,
selecting a first operating configuration, associated with the rest condition of the pointing device,
starting from the first operating configuration, comparing the velocity signals with a first threshold,
selecting a second operating configuration, associated with the motion condition of the pointing device if the first threshold is exceeded,
starting from the second operating configuration, comparing the velocity signals with a second threshold, and
selecting the first operating configuration, if the second threshold is not exceeded; and
determining an estimate of stationary disturbance contained in the first acceleration signals if the pointing device is in the rest condition.

35. The article of manufacture of claim 34 wherein the computer-readable medium further includes instructions stored thereon that are executable by the processor to control the pointing device by subtracting the estimate from the first acceleration signals to generate second acceleration signals.

36. The article of manufacture of claim 34 wherein instructions for subtracting include instructions for subtracting a current value of the estimate if the pointing device is in the rest condition and subtracting a stored value of the estimate if the pointing device is in the motion condition.

37. A computer system, comprising:
a pointing device;
an inertial sensor included with the pointing device to supply first acceleration signals indicative of an acceleration of the pointing device according to two detection axes;
a processing unit, coupled to the inertial sensor, to generate velocity signals indicative of a velocity of the pointing device, on a basis of the first acceleration signals;
a state-recognition unit to selectively recognize a rest condition and a motion condition of the pointing device, on a basis of the velocity signals generated by the processing unit;
an estimation module, coupled to and controlled by said state-recognition unit, to determine an estimate of stationary disturbance contained in the first acceleration signals if the pointing device is in the rest condition;
a subtraction module, coupled to the inertial sensor and to the estimation module, to subtract the estimate from the first acceleration signals and to generate second acceleration signals;
a storage unit, associated to the estimation module for receiving the estimate when the pointing device is in the rest condition;
wherein the estimation module is controlled by the state-recognition unit for supplying a current value of the estimate the subtraction module when the pointing device is in the rest condition, and the storage unit is controlled by the state-recognition unit for supplying a stored value of the estimate to the subtraction module when the pointing device is in the motion condition; and
an interface coupled included with the pointing device to allow the pointing device to communicate with some other component of the computer system.

38. The computer system of claim 37 wherein said inertial sensor means comprise a micro-electro-mechanical accelerometer.

39. A pointing device for a computer system including a displacement transducer of the pointing device, wherein said displacement transducer comprises:
an inertial sensor to supply first acceleration signals indicative of an acceleration of the pointing device according to two detection axes; and
processing means, associated to said inertial sensor for generating velocity signals indicative of a velocity of the pointing device, on a basis of said first acceleration signals;
wherein said processing means includes state-recognition means for selectively recognizing a rest condition and a motion condition of the pointing device, on a basis of said velocity signals; and
estimating means, controlled by said state-recognition means for determining an estimate of stationary disturbance contained in said first acceleration signals when the pointing device is in the rest condition, wherein said estimating means comprise an infinite-impulse-response filter of a first order.

40. The device according to claim 39 wherein said processing means comprise a first storage element, associated to said estimating means for receiving said estimate when the pointing device is in the rest condition.

41. The device according to claim 39 wherein said processing means comprise subtraction means for subtracting said estimate from said first acceleration signals and for generating second acceleration signal and wherein said processing means comprise first integrating means for generating said velocity signals from said second acceleration signals.

42. The device according to claim 41 wherein said state-recognition means comprise a first comparator and a second comparator, coupled to said first integrating means for comparing said velocity signals with a first threshold and, respectively, a second threshold.

43. The device according to claim 41 wherein said first integrating means comprise a moving-average filter for generating said velocity signals on a basis of said second acceleration signals, selectively when the pointing device is in the rest condition.

* * * * *